Patented Apr. 18, 1933

1,904,243

UNITED STATES PATENT OFFICE

MAX LANDECKER, OF BARMEN, GERMANY

MOLDING POWDER AND METHOD OF MOLDING

No Drawing. Application filed July 11, 1929, Serial No. 377,589, and in Germany May 29, 1928.

This invention relates to the molding of objects from synthetic masses.

Molded articles made from urea-aldehyde condensation products are known. They have many useful and desirable properties, such as their ability to take light colors, their color fastness to light and their high resistance to chemical reagents and physical stress. Such products are intended and designed to compete with the well known phenolic condensation products.

It is, however, an unescapable fact that molded articles made from aldehyde-urea condensation products and especially the translucent shades are more difficult to produced than articles made from phenolic condensation products because the operations involved in pressing and molding the former require such great compressive forces as to restrict commercial production. For example, to mold these urea condensation products, 4000 pounds pressure per square inch is required even in the manufacturing of small and simple articles.

Press seams of molded articles should be paper-thin, and easily obliteratable. This has not been true in the molding of urea condensation products because of their poor flowing properties. Previously in molding urea condensation products the press seam naturally has been heavy and could only be removed by subsequent working, leaving a visible and detrimental seam. This results in an inferior product and an increase in the cost of manufacture.

All of these difficulties found in the molding of urea-aldehyde condensation products are the result of the inferior flowing quality of urea-formaldehyde compounds as compared with that of phenolic compounds. The difficulties experienced have been due to a lack of appreciation of the distinct differences between the properties of urea-formaldehyde and phenolic condensation products. Because of this lack of appreciation, it has heretofore been customary to mold these urea-formaldehyde products in the same manner as the resinous phenolic condensation products, with the unfavorable results mentioned above.

One of the primary objects of this invention is to eliminate the difficulties in the molding of urea-aldehyde products stated above. Other objects of this invention will appear from the following description.

I have found that a tremendously increased fluidity or plasticity can be imparted to urea-formaldehyde products by adding to them a portion of a moistening fluid such for example as water. In this characteristic, the urea-formaldehyde condensation products bear a distinct resemblance to albumen-like masses such as casein, horn, blood, glue and vegetable albumen, etc., which are known not to flow sufficiently if not supplied with water but which show an excellent plasticity if they are molded with sufficient added water. If, for instance, approximately 5% by weight of water be added to the powdered urea-formaldehyde molding material, the powder attains an excellent fluidity. The plasticity so acquired is so great that the moistened powder flows under a pressure of less than 1000 pounds per square inch and rapidly allows the overflow to flow out of the mold. The result is that the mold closes quickly and produces a pressed article of high luster, with paper-thin seams and having a perfect reproduction of the design of the mold. Shrinkage of the finished products lies within the practical limits.

While water as described above is probably the most generally useful means of increasing plasticity, other means may be employed. For instance, I may use a salt which upon heating or otherwise will liberate water of crystallization. Other liquids which are plasticizers for natural albumen material, such as alcohols, ketones, amines, may be used. Hygroscopic substances may also be used, if desired, in proper proportions to obtain the desired water from the atmosphere. Additional substances for instance, acids, alkalies or other desired substances may be added of course to the water or other plasticizing agents mentioned above.

In the working of the urea-formaldehyde condensation product into molded objects, it is usually desirable, though by no means imperative, to add only enough water to the molding powder as will still allow it to retain its powdered form, although there is no objection to increasing the water addition if more satisfactory results may be obtained. In place of the addition of water to the dry product one can also proceed by drying the condensation mass only to the desired moisture content. This may be done by passing it through hot rollers back and forth until the desired moisture content is obtained. The total water content should preferably be at least 10%, and may in some cases advantageously be as high as 15 or 20%.

These water containing urea-aldehyde condensation products may be molded at temperatures of approximately 110° C., with only 700 to 1000 pounds pressure per square inch. The pressed articles do not stick to the molds and have very good elasticity, strength and water resistant qualities even immediately after molding. If desired these properties may be further improved by subsequent heat treatments.

It should be appreciated that the main reason for the widespread usage and economic success of the phenol resins has been due to their fluidity when processing. It is due to this property that it has been possible to make large and complicated articles while using comparatively low pressures. Until the present time, urea-formaldehyde products have had a very limited use because they have been unable to equal these results both as to molding and from an economic standpoint. Previously, as has been pointed out above, due to this lack of fluidity it has been necessary to use pressures of about 4000 pounds per square inch and larger articles and more complicated designs such as lampshades, lampstands, fountain pens, etc., could not be manufactured. This was due to the fact that the molds had a short life due to the excessive pressure and further that because of the high pressure necessary multiple dies could not be used. As I have shown above by increasing the fluidity of the urea-aldehyde condensation products, I am able to produce large and complicated articles with low pressure and on a commercial basis. Further these products now have paper-thin press seams. This is absolutely necessary to avoid expensive subsequent operations and poor products.

These articles have a tendency to shrink on account of the moisture in the molding powder and will not crack later on. Cracking was especially common in translucent articles made from urea-aldehyde condensation products by the former methods.

It is obvious that filling, coloring materials and the like may be added at the will of the operator. Other changes or developments may be made, which would be apparent to one skilled in the art. Such variations are to be considered as included in my invention which is to be limited only by the state of the prior art and the scope of the appended claims.

I claim:

1. A process for the manufacture of molded articles from urea-aldehyde condensation products, comprising adding to powdered urea-aldehyde condensation products a quantity of water such that the total water content is not less than about 10%, the water added being insufficient to destroy the powdered character of the mass, and molding the powder under heat and pressure.

2. A process for the manufacture of molded articles from urea-aldehyde condensation products, comprising adding to powdered urea-aldehyde condensation products a quantity of water such that the total water content is not less than about 10%, the water added being insufficient to destroy the powdered character of the mass, and molding the powder under heat and a pressure not substantially exceeding 1,000 pounds per square inch.

3. A molding powder possessing the property of flowing under heat and pressure and comprising powdered urea-aldehyde condensation products containing not less than about 10% of water.

4. A process for the manufacture of molded articles from urea-aldehyde condensation products, comprising adding to powdered urea-aldehyde condensation products a quantity of water such that the total water content is not less than about 5%, the water added being insufficient to destroy the powdered character of the mass, and molding the powder under heat and pressure.

5. A process for the manufacture of molded articles from urea-aldehyde condensation products, comprising adding to powdered urea-aldehyde condensation products a quantity of water such that the total water content is not less than about 5%, the water added being insufficient to destroy the powdered character of the mass, and molding the powder under heat and a pressure not substantially exceeding 1,000 pounds per square inch.

6. A molding powder possessing the property of flowing under heat and pressure and comprising powdered urea-aldehyde condensation products containing not less than about 5% of water.

In testimony whereof, I have signed my name to this specification this 4th day of May, 1929.

MAX LANDECKER.